July 22, 1924.
C. GABRIELSON
1,502,624
ADJUSTABLE ARBOR SUPPORT FOR MILLING MACHINES
Original Filed June 10, 1920   2 Sheets-Sheet 1
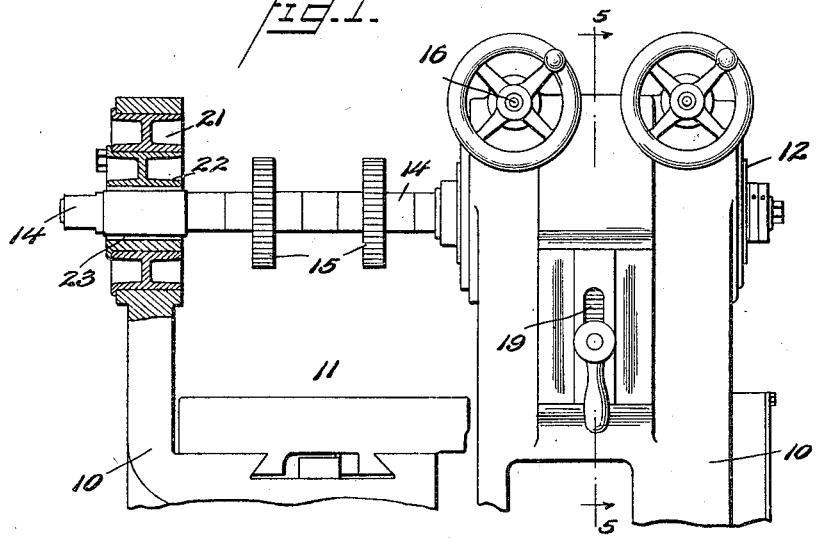
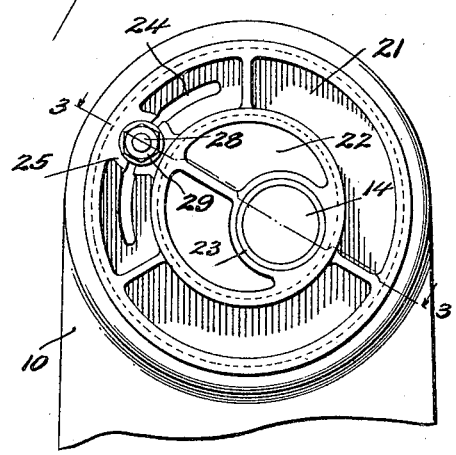
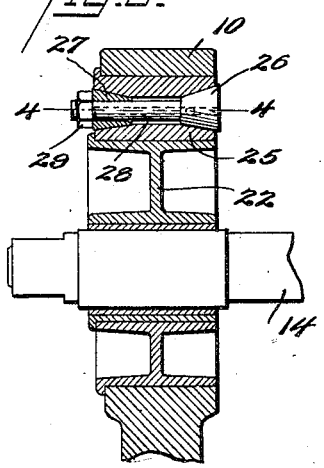
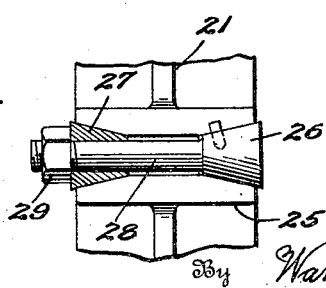
Inventor
Carl Gabrielson,
By Watson, Coit, Morse & Grindle
Attorneys

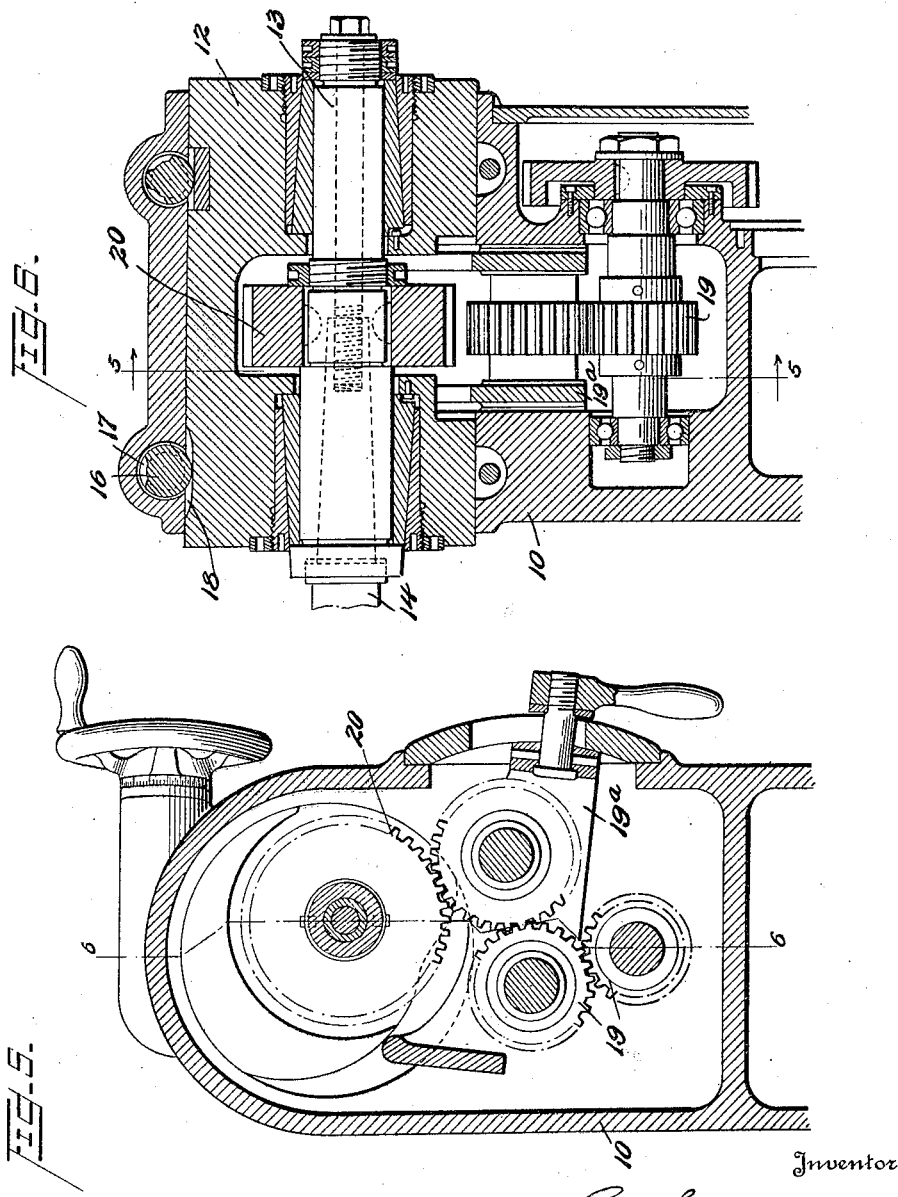

Patented July 22, 1924.

1,502,624

UNITED STATES PATENT OFFICE.

CARL GABRIELSON, OF SYRACUSE, NEW YORK, ASSIGNOR, BY MESNE ASSIGNMENTS, TO MELDRUM-GABRIELSON CORPORATION, OF SYRACUSE, NEW YORK, A CORPORATION OF NEW YORK.

ADJUSTABLE ARBOR SUPPORT FOR MILLING MACHINES.

Original application filed June 10, 1920, Serial No. 388,014. Divided and this application filed January 3, 1922. Serial No. 526,694.

*To all whom it may concern:*

Be it known that I, CARL GABRIELSON, a citizen of the United States, and residing at Syracuse, Onondaga County, State of New York, have invented certain new and useful Improvements in Adjustable Arbor Supports for Milling Machines, of which the following is a specification.

This invention relates to milling machines and is a division of my prior application Ser. No. 388,014, filed June 10, 1920.

The object of the invention is to provide an adjustable support for the free end of the arbor carrying the milling cutters which support will permit the position of the arbor to be readily changed. More specifically the invention aims to provide a support which may be locked in position to hold the free end of the arbor in the position desired and unlocked to permit easy and ready adjustment of the arbor relative to the table or support on which the work is mounted.

The mechanism by which these and other valuable results are attained is illustrated in the accompanying drawings forming a part of this specification and in which:

Fig. 1 is a front elevation, partly in section, showing the upper portion of a milling machine with the present improvement applied thereto;

Fig. 2 is an enlarged side elevation of the adjustable arbor support of the present invention;

Fig. 3 is a sectional view on line 3—3 of Figure 2;

Fig. 4 is an enlarged sectional view on the line 4—4 of Figure 3;

Fig. 5 is a sectional view on the line 5—5 of Figure 1 and shows the general arrangement for adjusting the spindle and arbor carried thereby;

Fig. 6 is a sectional view on the line 6—6 of Figure 5.

In order to clearly understand the purpose of the present invention, brief reference will be made to the mechanism employed for changing the position of the spindle and the arbor mounted therein, this mechanism being described at length and claimed in my prior application heretofore mentioned.

Referring to the drawings in detail, 10 indicates the frame of the machine which extends upwardly on opposite sides of the table 11 which table is adapted to receive the work to be operated upon. Within the upwardly extending portion of the frame 10 on one side of the table 11 there is rotatably mounted a sleeve 12 in which a spindle 13 is eccentrically journaled. The spindle 13 is adapted to receive and securely hold a cutter carrying arbor 14 which projects above the top of the table 11 and which is provided with suitable cutters 15 for operating upon the work secured to the table. The arbor 14 is secured to the spindle 13 in any suitable manner so as to be rigid therewith. Means are provided for rotating the sleeve 12, such means comprising a shaft 16 mounted in the frame 10 and carrying the worm 17, which worm is adapted to engage teeth 18 formed on the outer surface of the sleeve 12. By rotating the shaft 16, the sleeve 12 may thus be rotated in its bearing and the position of the spindle 13, eccentrically mounted therein, can thus be varied which results in changing the position of the arbor 14 with reference to the table 11. A suitable train of gears, generally designated by the numeral 19, is provided for rotating the spindle 13 and the arbor 14, one gear of this train being carried by a rocker 19ª by which it is held in mesh with a gear 20 secured to the spindle.

The foregoing mechanism is fully described in said prior application and further detailed description of the same is deemed unnecessary.

As already noted, the present invention relates to the means for supporting the free end of the arbor 14 so as to permit the position of the arbor to be changed as the sleeve 12 is rotated as heretofore described. Such means comprise an outer annular bushing 21 which is rotatably mounted in a part of the frame 10 and an inner bushing 22 rotatably mounted in the bushing 21. The bushing 22 is provided with an opening 23 arranged eccentrically therein, in which opening the arbor 14 is journaled. The eccentric arrangement of the arbor 14 in the bushing 22 corresponds to the arrangement of the spindle 13 in the sleeve 12 so that, when said sleeve is rotated to adjust the position of the spindle 13 and the arbor 14 mounted therein, as heretofore pointed out, the bushing 22 will also rotate, it being understood that at such time the bushings 21 and 22 are unlocked or free to rotate in the frame 10. To provide for locking the bushings 21 and 22 together and to the frame 10 after the arbor 14 has been adjusted to any desired position the bushing 21 is slotted as shown at 24, which slot preferably extends for a considerable distance in a direction substantially parallel or concentric with the outer circumference of the bushing 21. The slot 24 extends through a boss or enlarged portion 25 of the bushing 21 and in such enlarged portion two conical wedge members 26 and 27 are arranged, the former, preferably constituting the rigid head of a bolt 28 and the latter being mounted on said bolt. The bolt extends through the bushing 21 and is provided with a nut 29 by which the wedge members 26 and 27 may be drawn toward each other and the bushing 21 expanded. By such expansion the bushing 21 is securely locked or clamped to the frame 10 of the machine and also to the bushing 22 mounted therein.

It will be understood that when the arbor 14 is to be adjusted by changing the position of the sleeve 12 as heretofore described, the nut 29 will be loosened so that the wedge members 26 and 27 will not act to expand the slotted portion of the bushing 21 and lock the same to the frame and to the bushing 22. When the bushings 21 and 22 are thus unlocked from each other and from the frame 10, the arbor 14 can be readily adjusted to any desired position relative to the table 11. Such adjustment can be easily and quickly effected because the inner bushing 22 is comparatively light and will easily rotate within the outer bushing 21. In other words, in adjusting the arbor or spindle 14 up or down the spindle is compelled to move only the comparatively light inner bushing 22, the outer bushing remaining stationary. The outer bushing may, of course, be removed when it is desired to place a larger cutter on the arbor. After adjustment of the arbor is effected, the nut 29 is again tightened to cause the wedge members 26 and 27 to expand the bushing 21 and lock the same to the frame 10 and to the bushing 22. A simple and effective means is thus provided for supporting the free end of the arbor, such means permitting adjustment of the arbor to any desired position and serving to rigidly hold the same in the position to which it has been adjusted.

Various changes in the details of construction may, of course, be made without departing from the spirit of the invention as defined in the appended claims.

Having thus described the invention what is claimed as new and desired to be secured by Letters Patent is:

1. In a machine of the kind described, a frame, a table, an arbor adjustable toward and from the table, means for supporting the free end of the arbor comprising a cylinder bushing rotatably mounted in said frame, the free end of said arbor being eccentrically journalled in said bushing, and means for locking said bushing in the desired position.

2. In a machine of the kind described, a frame, a table, an arbor adjustable toward and from the table, means for supporting the arbor comprising, a bushing rotatably mounted in the frame, a second bushing rotatably mounted in said first bushing, said arbor being eccentrically journaled in said second bushing, and means for locking said bushings together and to the frame.

3. A mechanism of the kind described comprising, in combination, an outer bushing, means for supporting the same, an inner bushing rotatably mounted in the outer bushing, said inner bushing having an opening eccentrically arranged therein for receiving the arbor, and means for locking said bushings together and to said supporting means.

4. A mechanism of the kind described comprising, in combination, a frame, an outer bushing rotatably mounted in the frame, an inner bushing rotatably mounted in the outer bushing, said outer bushing having a slot therein, and means to expand the slotted portion of said outer bushing to lock the same to the frame and to the inner bushing.

5. A mechanism of the kind described comprising, in combination, a frame, an outer bushing rotatably mounted in the frame and having a curved slot therein arranged parallel with the circumference thereof, an inner bushing rotatably mounted in the outer bushing and having an opening for receiving an arbor, and wedge means arranged in said slot for expanding said outer bushing to lock the same to said frame and said inner bushing.

6. A mechanism of the kind described comprising, in combination, a frame, an outer bushing rotatably supported therein, a second bushing rotatably supported in said first bushing and having an opening eccentrically arranged therein for receiving an arbor, said outer bushing having a boss formed thereon and having a curved slot extending concentric with the periphery of the bushing and intersecting said boss, conical wedge members arranged in said boss, and means for drawing said wedge members toward each other to expand the slotted portion of said bushing, whereby the same is locked to the frame and to the inner bushing.

7. In a machine of the kind described, a frame, a work table supported thereon, said frame extending above said table on opposite sides thereof, a cutter carrying arbor arranged above said table, means for supporting one end of said arbor and for moving the same toward and from the table, means for supporting the opposite end of the arbor, said last named means comprising a cylindrical bushing rotatably mounted in said frame, a second bushing rotatably mounted in said first bushing, said arbor being eccentrically journaled in said second bushing, and means for locking said bushings together and to said frame.

8. In a machine of the kind described, a frame, a work table supported thereon, said frame extending above said table on opposite sides thereof, a sleeve mounted in said frame at one side of said table, a cutter carrying arbor journalled eccentrically in said sleeve and extending above said table, means for rotating said sleeve to move the arbor toward and from the table, a cylindrical bushing mounted in said frame at the other side of the table, a second bushing mounted in said first bushing, said arbor being eccentrically journaled in said second bushing, and means for locking said bushings together and to said frame.

9. In a machine of the kind described, a frame, a table on said frame, an arbor arranged above said table, means for supporting said arbor so that the same may be moved toward and from said table, said means comprising a cylindrical bushing rotatably mounted in said frame, a second bushing rotatably mounted in said first bushing, said arbor being journaled eccentrically in said second bushing, said first bushing having an arc shaped slot extending parallel to its circumference, and wedge members arranged in said slot for expanding said bushing to lock the same to said second bushing and to said frame.

10. In a machine of the kind described, a table, an arbor, means for adjusting the arbor in the arc of a circle toward and from the table, means for supporting the free end of the arbor comprising a cylindrical bushing rotatably supported adjacent said table, the free end of said arbor being eccentrically journalled in said bushing, and means for locking said bushing in the desired position.

11. In a machine of the kind described, a table, an arbor, means associated with one end of said arbor for rotating the same and for moving it through the arc of a circle toward and from said table, means for supporting the other end of the arbor comprising a cylindrical bushing rotatably mounted adjacent said table, the last named end of said arbor being eccentrically journaled in said bushing, and means for locking said bushing in the desired position.

In testimony whereof I hereunto affix my signature.

CARL GABRIELSON.